(12) United States Patent
Lorca Hernando

(10) Patent No.: US 9,072,113 B2
(45) Date of Patent: Jun. 30, 2015

(54) METHOD AND NETWORK ENTITY FOR SCHEDULING RADIO RESOURCES IN MOBILE COMMUNICATION NETWORKS

(75) Inventor: Javier Lorca Hernando, Madrid (ES)

(73) Assignee: TELEFONICA, S.A., Madrid (ES)

( * ) Notice: Subject to any disclaimer, the term of this patent is extended or adjusted under 35 U.S.C. 154(b) by 134 days.

(21) Appl. No.: 13/985,942

(22) PCT Filed: Feb. 17, 2012

(86) PCT No.: PCT/EP2012/052806
§ 371 (c)(1),
(2), (4) Date: Oct. 14, 2013

(87) PCT Pub. No.: WO2012/110650
PCT Pub. Date: Aug. 23, 2012

(65) Prior Publication Data
US 2014/0036862 A1  Feb. 6, 2014

(30) Foreign Application Priority Data
Feb. 17, 2011 (ES) .................................. 201130214

(51) Int. Cl.
H04W 72/08 (2009.01)
H04W 72/12 (2009.01)

(52) U.S. Cl.
CPC ........ H04W 72/085 (2013.01); H04W 72/1226 (2013.01)

(58) Field of Classification Search
USPC .................. 370/330, 329, 328, 332, 333, 341
See application file for complete search history.

(56) References Cited

U.S. PATENT DOCUMENTS

| 8,953,551 | B2* | 2/2015 | Inoue et al. | 370/330 |
| 2009/0073926 | A1* | 3/2009 | Lee et al. | 370/329 |
| 2009/0110087 | A1 | 4/2009 | Liu | |
| 2009/0296574 | A1 | 12/2009 | Liao | |
| 2010/0165932 | A1 | 7/2010 | Wan | |

FOREIGN PATENT DOCUMENTS

WO   WO 2007/105977   9/2007

OTHER PUBLICATIONS

International Search Report for International Application No. PCT/EP2012/052806 mailed May 7, 2012.
(Continued)

*Primary Examiner* — Thai Nguyen
(74) *Attorney, Agent, or Firm* — Pearl Cohen Zedek Latzer Baratz LLP

(57) ABSTRACT

A method and radio network entity for scheduling resources comprising: selecting the user for which the scheduling metric calculated based on CQI reports is a main maximum in a certain frequency subband and checking whether there is another subband in which the selected user has a calculated scheduling metric value higher than the main maximum. If so, secondary maxima of scheduling metrics for said user and others in another different subband are searched and compared with the previous calculated maximum. According to the result of this comparison, each user is assigned to at least one frequency subband, up to K subbands which can be adjacent or not depending upon the configuration of the network entity in uplink and downlink (e.g., supporting LTE). Scheduling of both time and frequency resources is optimized and simultaneously the throughput of users in a cell is maximized.

17 Claims, 17 Drawing Sheets

(56) References Cited

OTHER PUBLICATIONS

Suk-Bok Lee et al: "Proportional Fair Frequency-Domain Packet Scheduling for 3GPP LTE Uplink", INFOCOM 2009, The 28th Conference on Computer Communications, IEEE, IEEE, Piscataway, NJ, USA, Apr. 19, 2009, pp. 2611-2615.
"3rd Generation Partnership Project; Technical Specification Group Radio Access Network; Evolved Universal Terrestrial Radio Access (E-UTRA); Base Station (BS) radio transmission and reception (Release 8)," 3GPP TS 36.104 V8.0.0, Dec. 2007.
Lee, Suk-Bok et al. "Proportional Fair Frequency-Domain Packet Scheduling for 3GPP LTE Uplink," UCLA Computer Science Department Technical Report: TR-090001, 2009.
"LTE; Evolved Universal Terrestrial Radio Access (E-UTRA); Physical layer procedures (3GPP TS 36.213 version 8.8.0 Release 8)," ETSI TS 136 213 V8.8.0, Oct. 2009.

* cited by examiner (STATE OF THE ART)

METHOD AND NETWORK ENTITY FOR SCHEDULING RADIO RESOURCES IN MOBILE COMMUNICATION NETWORKS

CROSS-REFERENCE TO RELATED APPLICATIONS

This application is a National Phase Application of PCT International Application No. PCT/EP2012/052806, International Filing Date Feb. 17, 2012, claiming priority of Spanish Patent Application No. P201130214, filed Feb. 27, 2011, which is hereby incorporated by reference.

TECHNICAL FIELD OF THE INVENTION

The present invention relates to a scheduler and a method for scheduling radio resources in wireless cellular networks. More particularly, the radio resources to be scheduled in the context of this invention are both frequency and time resources assignable to the users of the wireless cellular network (e.g., a network supporting radio technologies from Third or Fourth Generation or beyond, specified by the 3rd Generation Partnership Project).

BACKGROUND OF THE INVENTION

Long-Term Evolution (LTE) is the next step in 3rd Generation (3G) cellular networks, which represents basically an evolution of the current mobile communications standards. The actual standard is known as the International Telecommunication Union (ITU) 3rd Generation Partnership Project (3GPP), Release 8, although the term LTE is often used to reference the standard. LTE is considered by many to be a Fourth Generation (4G) technology, both because it is faster than 3G, and because, like the Internet, LTE uses a flat "all-IP" architecture where all information, including voice, is handled as data. LTE provides throughputs up to 50 Mbps in uplink and up to 100 Mbps in downlink, uses scalable bandwidth from 1.25 to 20 MHz in order to suit the needs of network operators that have different bandwidth allocations and is also expected to improve spectral efficiency in networks, allowing carriers to provide more data and voice services over a given bandwidth.

Orthogonal Frequency Division Multiple Access (OFDMA) is specified as the downlink multiple access scheme in 3GPP LTE, which divides the available bandwidth into multiple narrow orthogonal frequency bands. For the uplink in LTE networks, Single-Carrier Frequency Division Multiple Access (SC-FDMA) is defined, which may be considered similar to OFDMA but with an additional Discrete-Fourier Transform that spreads the symbols prior to modulation and achieves a lower Peak-to-Average Power Ratio. Both OFDMA and SC-FDMA allow the base station (known as enhanced NodeB or eNodeB) in LTE networks to assign different "chunks" of time and frequency to the users in a cell.

In 3G and 4G networks there are several mechanisms by which the user equipment (UE) can inform the base station (e.g., NodeB or eNodeB) on the radio conditions and among the parameters used for this purpose, the quantity which is defined to measure the instantaneous quality of the radio conditions is called Channel Quality Indicator (CQI). The parameter CQI may refer to the whole bandwidth, or may be expressed as a set of values, each one referred to a different frequency subband in LTE.

One of the advantages of using OFDMA and SC-FDMA in the LTE radio interface is the possibility of supporting frequency selective scheduling (FSS) based on the CQI values reported by the UE to the eNodeB (through standardized procedures) and the estimations performed by the eNodeB (based on the sounding reference signals sent by the UE to assist the network in allocation of appropriate frequency resources for uplink transmission). The aim of any frequency selective scheduler is the optimal assignment of the available resources to the users in order to maximize the cell capacity of the wireless network as well as the throughput perceived by each user.

Due to the differences between uplink (UL) and downlink (DL), motivated by the different characteristics of OFDMA (used in DL) and SC-FDMA (used in UL), the scheduler must operate in a different way when dealing with DL and UL traffic. In downlink, the users may be assigned any combination of frequency subbands, but in uplink there is a contiguity constraint by which each user must be assigned a block of contiguous subcarriers. The scheduler must cope with the problem of obtaining optimal solutions for both strategies.

In OFDMA, the controllable radio resource has three aspects: frequency, time and space. A Physical Resource Block (PRB) is the basic time-frequency resource allocable for data transmission. The PRB is defined by 3GPP as a set of time frequency resources whose size is the minimum resource allocation size. Each so-called PRB is determined by its frequency extension (180 kHz) and its time extension (0.5 ms), and data are transmitted over one or more PRBs consisting of a set of contiguous sub-carriers and having a predefined time extension. Each subband comprises several PRBs.

The usual approach for scheduling of time and frequency resources is to decouple both dimensions, i.e. to make independent decisions in time and frequency so as to simplify the scheduling algorithm depicted in FIG. 1. In a first step (12) of the algorithm, which uses the reported CQI values as input (11) and results in scheduling pairs (16) formed by a user and its allocated subband, a number of users (13) is selected for time-domain scheduling in the next time interval (in LTE it is called TTI: Time Transmission Interval) or the minimum assignment interval. In a second step (14), a frequency-domain scheduling allocates PRBs or subbands (15) to the selected users (13). This method, described in US 2010165932 A1, has the problem of not optimizing time and frequency assignments simultaneously, so wrong scheduling decisions in the time domain may affect frequency domain scheduling. Besides, frequency domain scheduling is not optimal if restricted to only the subbands' frequency response of the previously selected users.

The LTE standard specifies that the scheduler (and the network entity usually in charge of resource scheduling in 3GPP systems is the base station, i.e., the eNodeB in LTE) is supposed to know all the CQI reports sent by the UEs on previous reports, and that these reports refer to the number of subbands. On a subframe basis, the scheduler running in the eNodeB first obtains a set of scheduling metrics for all the available combinations of pairs(user, subband), and then tries to find the optimal set of pairs so as to maximize the global cell throughput. A scheduling metric is a value used to select a UE and a particular subband for DL or UL scheduling. The metrics are then updated according to the scheduled resources for the next subframe. Such metrics may be based upon the Proportional Fair (PF) criterion, thus dividing the attainable throughput of each pair(user, subband) by the long-term average throughput of the users. This criterion takes into account each user's past history and tries not to benefit one user over another. Another possible criterion for the metrics may be to divide the throughputs by the long-term average resource use, measured as the number of subbands previously scheduled to the user.

Another solution for radio resource scheduling is disclosed in US 2009110087 A1, which discloses the use of threshold interference levels for identifying the subcarrier groups with interference below the current threshold interference level. This solution requires the estimation of threshold levels and, hence, there can be radio propagation conditions and situations for which this scheduling method cannot be accomplished.

US 20090296574 A1 describes another possible scheduling mechanism also referred as PFTF (Proportional Fair in Time and Frequency). PFTF is regarded as an extension of Proportional Fair criterion in the frequency domain, in which a chunk-wise scheduler makes independent decisions for each scheduling unit. This solution is not capable of assigning more than one scheduling unit for the same user. Moreover, it is not optimal, as the chunks are treated independently and no joint global solution is pursued.

On the other hand, mobile radio channels affect the transmitted signals introducing several degradations such as the time dispersion associated with the channel impulse response. This time dispersion comes from the fact that, at the receiver, several replicas of the original signal (called multipaths) are received with different amplitudes, delays and phases. These replicas interfere constructively or destructively depending on their relative phases, causing a frequency-selective degradation in the received signal. Therefore the received spectrum presents peaks and notches depending on the time dispersion of the channel. The peaks in the spectrum may be exploited by the scheduler, assigning users to those frequencies in which they are at better conditions, with the restriction of not assigning the same resources (time and frequency) to more than one user if it is operating in a single-input-single-output (SISO) antenna mode (i.e., one antenna for transmission and reception).

However, it is possible to find references to joint time-frequency scheduling algorithms, such as the one proposed in US 20090073926 A1. This algorithm describes an iterative "swapping" method that tries to find the optimal solution for assigning PRBs by provisionally assigning each PRB to the user having the corresponding highest metric and, then, looking at other PRBs and users previously assigned so that, if a higher throughput were obtained by exchanging any two PRBs and users, the swapping is performed. The procedure continues iteratively until all PRBs are assigned. This approach has the drawback that each user may be assigned only one PRB (and not any number, as is usually the case for real traffic). Especially when assigning contiguous frequency subbands to a single user, as is the case for LTE uplink, this solution is not suitable. In LTE downlink the users may be scheduled several non-localized frequency subbands, so it would neither be appropriate. Moreover, its complexity increases considerably with the number of PRBs, because for each new PRB one must pass the "swap" test over all previous assignments, and if a swap is performed between any two users, subsequent "swap checks" should be done against all users previously assigned.

Other existing solutions make some simplifications by assigning PRBs in an iterative way according to the CQI values, having the users ordered simply from best to worst values of CQI parameters. These approaches do not try to find the optimal solution, (indeed, an exact solution is very difficult to obtain, and in the case of uplink it is an NP-hard problem as stated by Lee et al. in the UCLA CSD TR-090001 "Proportional Fair Frequency-Domain Packet Scheduling for 3GPP LTE uplink", IEEE INFOCOM 2009), but they can serve as useful approximations with much lower complexity than a joint time and frequency scheduling algorithm.

Therefore, the objective is to find sub-optimal strategies for the scheduling, there being a trade-off between complexity and cell capacity improvement.

SUMMARY OF THE INVENTION

The present invention serves to solve the aforesaid problem by providing a FSS method which optimizes scheduling of the time and frequency resources simultaneously and the assignments of both resources to the users in a cell, improves the users' throughput and maximizes cell capacity with low complexity. The optimization process proposed here is more accurate, because time and frequency resources are jointly optimized, instead of doing independent (and concatenated) scheduling decisions for time and frequency, and neither of the two dimensions is restricted by the other.

In the context of the invention, capacity is understood as the amount of frequency and time resources required to deliver certain amount of information. The term "user" is applied as synonymous of user equipment (UE).

Since all wireless cellular technologies exploiting both time and frequency resources share similar scheduling policies, the problem and solution embodiments described here, although a preferred embodiment of the invention is related to time-frequency scheduling in LTE networks, are applicable to any wireless cellular technology.

The present invention deals with a method and an apparatus (network entity) for enhancing overall throughput in wireless cellular networks (e.g. LTE) by scheduling both time and frequency resources of the radio link between the users and the base station (e.g., eNodeB), in any of the downlink and uplink or both, based on quality parameters (CQI) reported by the users in addition to scheduling metrics calculated by said base station.

The present invention does not preclude the use of any definition of scheduling metric over another (e.g., the scheduling metric can be based on the relative distance measured between the base station and its neighbours or can use the long-term average users' throughputs applying the PF criterion). Thus, the invention may be utilized by any wireless technology that includes the possibility of assigning time and frequency resources to a number of users in a cell. The method and apparatus described here may serve to find the optimal set of pairs(user, subband) among all the possible ones, making some simplifications to avoid an exhaustive search that is extremely time-consuming, The optimal set of pairs(user, subband) is the one that maximizes the global sum of the scheduling metrics (e.g., maximizing the throughputs of the users in the subbands).

In accordance with one aspect of the invention, there is provided a method for scheduling frequency and time resources to transport data in PRBs over a radio link (in uplink and/or downlink), through which one or more CQI reports (from one or more user equipments) are received (by a network entity typically implemented in a base station such as an LTE eNode B). The method comprises the following steps:

i) defining a set of frequency bands assignable to users (the frequency bands can be adjacent or non-adjacent depending upon the configuration of the mobile cellular network in uplink or in downlink), ii) receiving at least a value of CQI reported from at least a user, iii) for each reporting user, calculating scheduling metrics based on the received values of CQI reports, iv) for each frequency band of the assignable set, selecting at least one user for which the calculated scheduling metric is a main maximum in a certain frequency band k, v) checking whether there is at least another frequency band (different from k) of the assignable set in which the selected user has a calculated scheduling metric value higher than the main maximum or not; if said frequency band exists, then the method further comprises:
    searching secondary maxima of calculated scheduling metrics for said user and other reporting users in the, at least, other frequency band,
    for every reporting user and the frequency bands considered in this step v, comparing the main maximum of each user with the secondary maxima of the rest of the reporting users,
    assigning each user to at least one of the considered frequency bands according to the result of the comparison;
vi) otherwise, i.e., if there is no other frequency band of the assignable set in which the selected user has a scheduling metric higher than the main maximum, said selected user is rightly assigned the to at least said certain frequency band k.

There are two versions of the scheduling method:
  i) in a localized-subbands version, each user must be scheduled a contiguous set of frequency bands or subbands (as in LTE uplink);
  ii) in a non-localized version there is not the aforementioned restriction, and the frequency (sub)bands may spread over the entire bandwidth (as in LTE downlink).

The steps i)-v) can be repeated updating the set of users which have already been scheduled, until all the possible frequency bands (from the assignable set) are assigned to users (from the set of users to be scheduled). There can be users having one or more frequency bands assigned (up to a maximum number of frequency bands assignable to a user) and there can be even users to which no frequency band is left for assigning.

In accordance with a further aspect of the invention, there is provided a scheduler and a network entity in which it runs, implemented in a base station (enhanced Node B for a LTE network) and comprises processing means for performing the method described before.

In accordance with a last aspect of the invention, it deals with a computer program comprising program code means which execute the method described before, when loaded into processing means of a network entity as defined above.

The main advantages of the invention can be listed here:
  Increasing of the cell throughput by properly assigning time and frequency resources to the users in a cell (most of the existing solutions decouple time and frequency domains, and therefore no joint global optimization is achieved).
  The higher cell throughput allows operators to increase the volume of traffic being served, thus increasing their revenues at no extra infrastructure cost.
  Improving of the throughput perceived by the users. As the users experience better radio conditions when properly scheduled, their quality of experience (QoE) is also enhanced.
  More efficient user assignment taking advantage of radio channels with a non-flat frequency response, such as those typically found in urban scenarios (which would otherwise be very harmful), thanks to the coupling of time and frequency in assigning users to frequency (sub) bands.
  Suitable for any wireless cellular system capable of scheduling time and frequency resources, such as (but not restricted to) LTE.
  Any number of resources (e.g., localized or non-localized frequency subbands) can be scheduled using the proposed FSS, unlike other existing solutions [e.g., US20090073926 or US20090296574] which propose mechanisms in which each user may be scheduled only one single PRB (no more than two PRBs).
  The complexity of the proposed FSS algorithm is linear in the number of users and subbands (in contrast, for instance, with the solution described in US2009/0073926, in which the complexity grows very quickly with the number of subbands).
  The proposed FSS algorithm does not require any threshold (in contrast, for instance, with the solution described in US2009/110087 and hence, the proposed FSS suits any radio propagation conditions and situations.
  There are two versions of the proposed scheduling, one for the case of localized frequency subbands and another for non-localized subbands. The two versions can cope with the differences that may exist in uplink and downlink resource allocation, as it is the case of LTE, so the invention suits the needs of next-generation cellular networks.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

The present invention refers to a scheduling method (with two possible versions) and apparatus (in a network entity) for an efficient FSS—Frequency Selective Scheduling—procedure of the users in a cell of a cellular network. For example, in the radio access network according to the LTE standard [3GPP TS 36.213, Evolved Universal Terrestrial Radio Access (E-UTRA); Physical Layer Procedures (Release 8)], the evolved NodeB—eNodeB—is specified to implement a scheduler of the radio resources among the different users, for both uplink and downlink, on a subframe basis, i.e., each 1 ms. There are both time and frequency resources to play with, and a possible implementation of the present invention described here is a method to optimize simultaneously both time and frequency assignments to the users, so that it is possible to maximize the cell capacity in a LTE system, while also improving the users' throughput.

Figure 2:
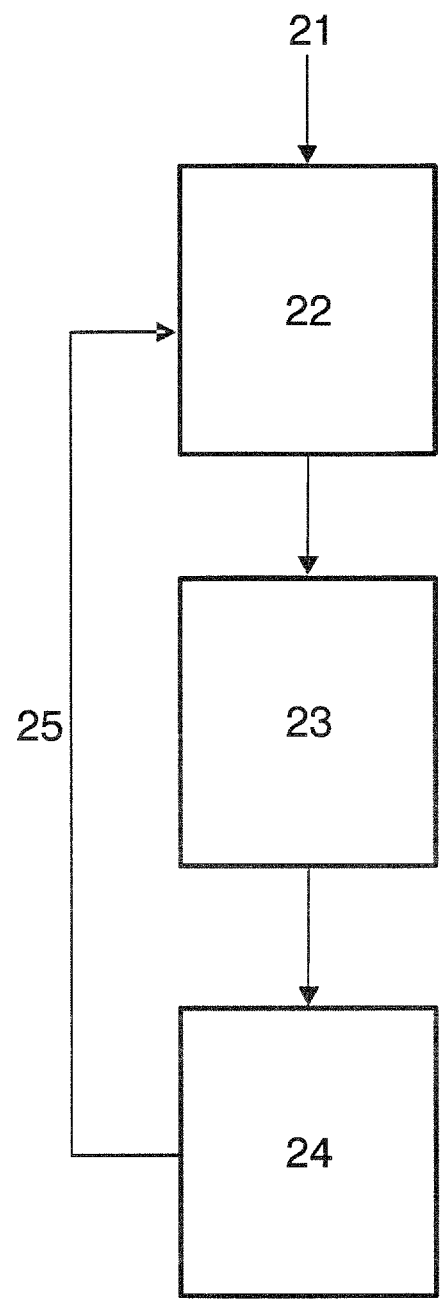
FIG. 2.—It shows a flow chart of a general procedure running in a scheduler, according to a possible embodiment of the invention.

FIG. 2 shows the main steps of a general FSS procedure implemented in a scheduler, e.g., running in a eNodeB.

The procedure depicted in FIG. 2 starts with a set of CQI values (21) reported by the user equipments—UEs—in the cell, each CQI value referring to one of the frequency subbands predefined in LTE [3GPP TS 36.213]. The size of the subband is determined by the system bandwidth and the type of subband reporting: higher layer-configured subband feedback and UE-selected subband feedback. Also, in the latter case there are differences in subband size whether periodic or aperiodic reporting mode is selected. In the present invention it is not important the actual subband size.

The set of CQI values (21) are transformed into scheduling metrics (22) calculated by the eNodeB following any of the usual criteria to obtain them, such as Proportional Fair. As an example, the scheduling metrics $T_{jk}$ can be obtained as the individual maximum bit rate, which is related to CQI, supported by a user in the subband, divided by the average past throughput of the user:

$$T_{jk} = \frac{\text{max. throughput of user } j \text{ in subband } k}{\text{average past throughput of user } j} = \frac{R_{ij}}{\langle R_j \rangle}$$

The attainable throughput $R_{ij}$ of user i in subband j is calculated in different ways, for example through the Shannon capacity formula:

$$R_{ij} = \log(1 + SNR_{ij}),$$

where $SNR_{ij}$ is equivalent to the CQI value of user j in subband i.

Another way of calculating the attainable throughput $R_{ij}$ is first to obtain the transport block size [using tables 7.1.7.2.1-1 and 7.1.7.2.2-1 of 3GPP TS 36.213], and then to divide its value by the subframe duration, i.e., 1 ms. The average past throughput $\langle R_j \rangle$ may be calculated by an autoregressive filter, but a more exact calculation method requires accumulating the actual throughput values over a number of past subframes, which are known to the eNodeB, so as to calculate its average.

Another definition of scheduling metrics $T_{jk}$ may be:

$$T_{jk} = \frac{\text{throughput of user } j \text{ in subband } k}{\text{average past resources of user } j}$$

The average past resources of user j may be calculated as the average number of scheduled subbands for that user, accumulated in a window of a specified number of subframes.

Whatever the definition of the metric, it is the set of values $T_{jk}$ that constitutes the basis for the optimization of the users and subbands to be scheduled.

Figure 1:
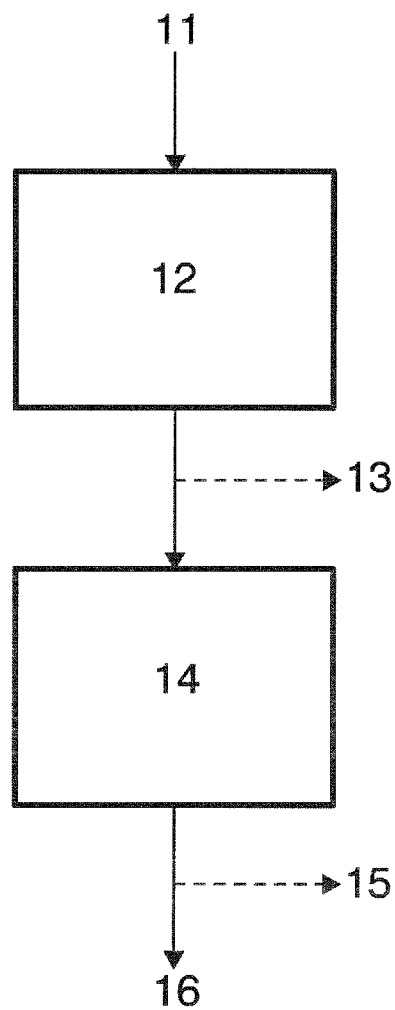
FIG. 1.—It shows a flow chart of a radio resource scheduling method as known in the prior art, which decouples time and frequency domains.

Therefore, based on the CQI values (21) reported by each user and on the average past throughput values—or past resources, depending on the actual metric definition-, the scheduling metrics are calculated (22). Based on these calculated scheduling metrics $T_{jk}$, the scheduler in the eNodeB chooses the optimal set of assignment formed by pairs of users and subbands (23). The proposed method deals with the optimal selection of users and subbands in such a way that both time and frequency resources are jointly optimized to maximize the cell capacity and the users' perceived throughput, while keeping fairness among the users. After running the proposed method, described in detail below, a number of users are scheduled for transmission, i.e. are granted at least one subband in frequency, and the precise location of the frequency subband or subbands is also specified. Therefore, both time and frequency resources are optimized as a result of the execution, as opposed to the usual scheduling approach depicted in FIG. 1 of decoupling time and frequency dimensions. After scheduling the corresponding users and subbands, the average values of user throughput are updated (24), so the scheduler can repeat (25) the procedure over time.

For the sake of explanation, assume a set of N users to be scheduled. Let us denote by n the total number of subbands to be scheduled, and K the maximum number of subbands that a user may be scheduled. All users may be scheduled any number of subbands, from zero to K. The set of metrics may be graphically depicted as a table (Table 1) with N rows and n columns:

TABLE 1

|  | Subband 0 | Subband 1 | ... | Subband n − 1 |
|---|---|---|---|---|
| User 0 | $T_{00}$ | $T_{01}$ | ... | $T_{0,n-1}$ |
| User 1 | $T_{10}$ | $T_{11}$ | ... | $T_{1,n-1}$ |
| ... | ... | ... | ... | ... |
| User N − 1 | $T_{N-1,0}$ | $T_{N-1,1}$ | ... | $T_{N-1,n-1}$ |

The main objective is to find a set of users and subbands such that the global sum of scheduling metrics $T_{jk}$ is maximized. If the user assigned to subband k is denoted by user(k), hence:

$$T_{user(0),0} + T_{user(1),1} + \ldots + T_{user(n-1),n-1} = \max$$

Figure 3:
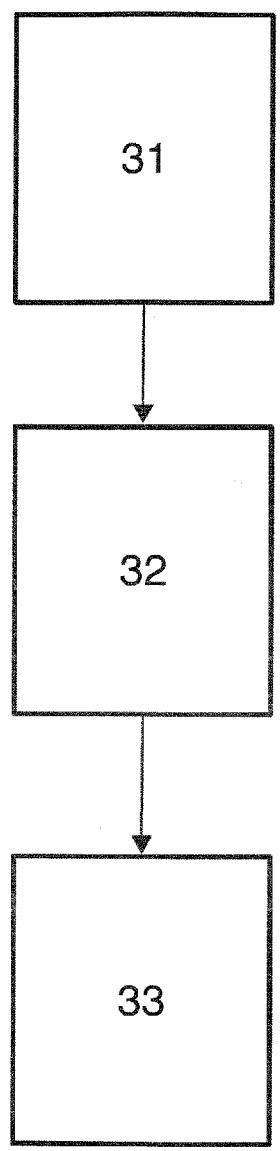
FIG. 3.—It shows a flow chart of determining the assignments between radio resources and users to be scheduled, according to a preferred embodiment of the invention.

FIG. 3 shows a preferred implementation, e.g., in the scheduler of an eNodeB, of the optimal selection set of the assignment pairs of users and subbands (23). A metrics generator (31) first obtains the set of scheduling metrics $T_{jk}$ that constitutes the basis for the optimization, for example, considering Proportional Fair or any other suitable criterion. Then, a metrics analyzer (32) examines the user whose metric is a main maximum given any one subband, and evaluates whether the selected user would be better suited for a different subband. To do so, the metrics analyzer (32) finds the secondary maxima of the involved subbands and takes a decision based on the two values, performing a comparison between the main maximum and each secondary maxima found before, as it is explained below. Finally, the scheduler makes the assignments (33) of users to subbands according to the results from the previous analysis (32). All these blocks (31, 32, 33) of FIG. 3, which in conjunction carry out the step of optimal selecting the assignment pairs (23) shown in FIG. 2, may be implemented in hardware, software, or a combination of both; actual implementations are dependent on constraints of the real equipments used for scheduling in the base station.

Figure 4:
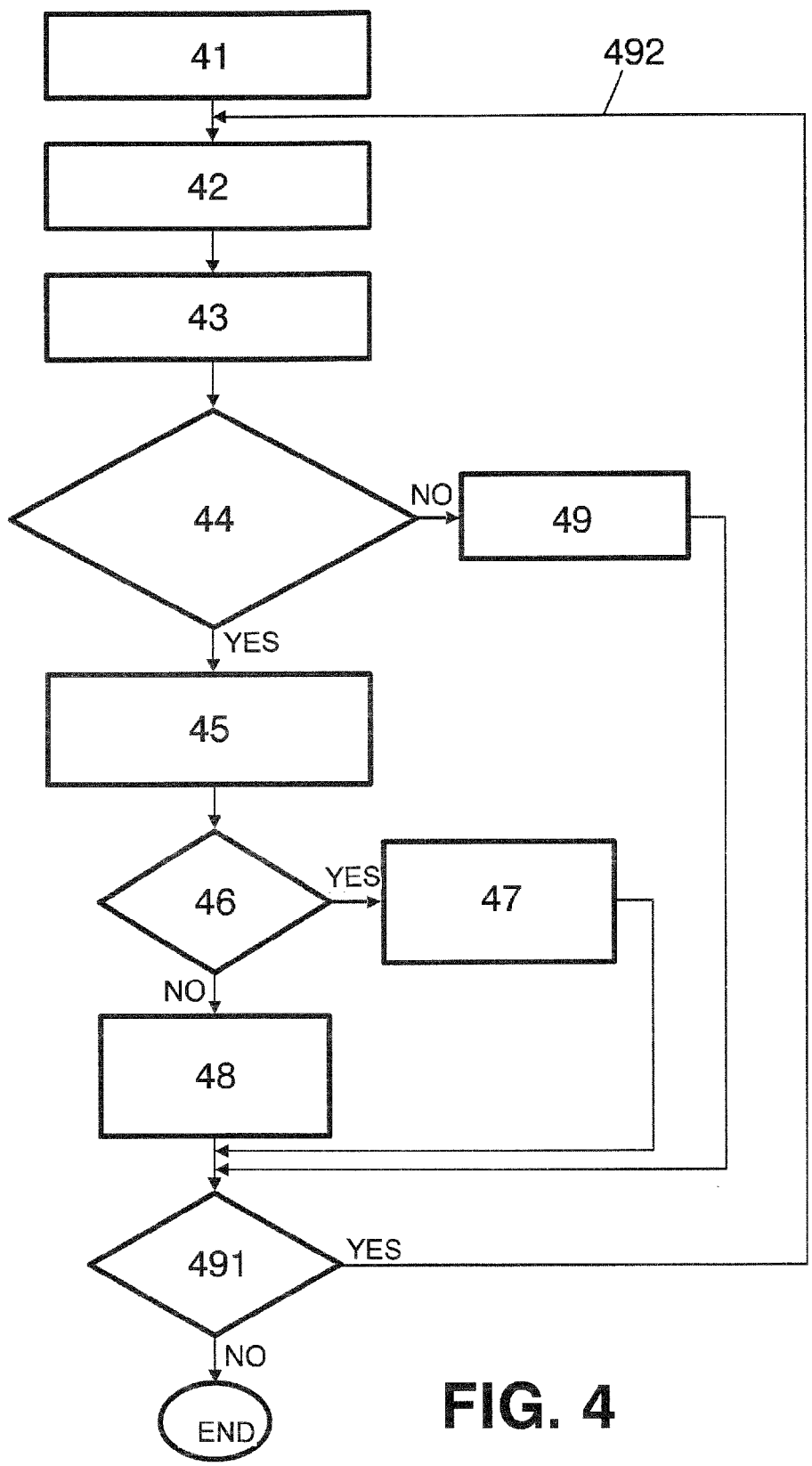
FIG. 4.—It shows a flow chart of a frequency selective scheduling, according to a possible embodiment of the invention wherein the scheduled frequency subbands are non-adjacent.

FIG. 4 shows the case in that the users can be scheduled a number, up to K, of subbands with no restriction on their locations in the spectrum; i.e. these subbands may be nonadjacent. The subbands to be scheduled are determined and assigned to the users by the FSS algorithm described as follows:

Let us denote by user(0), user(1), ..., user(n−1) the set of users which will be assigned to subbands 0, 1, ..., n−1 after completion of the FSS algorithm; their values may be initialized to −1. Let us denote by S the set of users that have already been scheduled K subbands throughout the proposed FSS algorithm. Mathematically, S is expressed as:

$$S = \{j \in [0, N-1] \text{ such that } j = \text{user}(k_0), \ldots, j = \text{user}(k_{K-1}) \\ \text{for } k_0, k_1, \ldots, k_{K-1} \in [0, n-1]\}$$

If any user has been scheduled a number of subbands less than K, it does not still belong to S and thus may be scheduled again by the FSS algorithm.

In FIG. 4, there is a first step of initialization (41) for initializing the values of the scheduling metrics $T_{jk}$ to the ones resulted from the metrics generator (31), in accordance to the actual scheduling metric definition or configuration of said metrics generator (31) of the scheduler, shown in FIG. 3. The step of initialization (41) also sets the initial value of the set of users S to S={Ø}. A random subband, namely k, is selected (42) from the set of subbands not assigned. Then, the proposed FSS algorithm proceeds with the following steps:

Selecting the user corresponding to a calculated scheduling metric which is a main maximum (43) in a certain frequency subband k. That is, choosing user j such that $$T_{jk} = \max_{j' \notin S} \{T_{j'k}\},$$

i.e. user j whose metric $T_{jk}$ is a maximum in column k, from the users not yet scheduled (not belonging to S). In the matrix this is equivalent to finding the maximum in column k. If there are several maxima, the selected user j is chosen randomly among the candidates.

Analyzing (44) whether there exists another subband l≠k in which this user j has a higher maximum value of the scheduling metric $T_{jk}$, i.e., the following three conditions are met:

$$\text{User}(l) = -1$$

$$T_{jl} > T_{jk}$$

$$T_{jl} = \max_{j' \in S} \{T_{j'l}\}$$

In this case user j might be a better candidate for subband l than for subband k.

To elucidate this, the algorithm looks for secondary maxima (45) of columns k and l by executing the following steps:

Choosing two other users $j_1$, $j_2$ such that their corresponding metrics in the subband k and subband l respectively are $$T_{j_1 k} = \max_{j' \notin S, j' \neq j} \{T_{j'k}\} \text{ and } T_{j_2 l} = \max_{j' \notin S, j' \neq j} \{T_{j'l}\}$$

The previously considered metrics are compared (46) by checking whether $T_{j_1 k} + T_{ji} > T_{jk} + T_{j_2 l}$. If so, the FSS algorithm assigns (47) user $j_1$ to subband k and user j to subband l: user(k)←$j_1$,user(l)←j. Otherwise, the algorithm assigns (48) user j to subband k and user $j_2$ to subband l: user(k)←j, user(l)←$j_2$.

In the contrary case, that is, no other subband l≠k in which the user j has a metric higher than the value in subband k is found, the FSS algorithm assigns (49) user j to subband k: user(k)←j.

The algorithm checks whether there are unassigned subbands (491). In case any user has already been scheduled the maximum number K of subbands throughout this algorithm, the corresponding row in the matrix is crossed out; otherwise it may still be taken into account for subsequent subband assignments. Each assigned subband must also be crossed out in the matrix, i.e., its associated column.

Those users with K subband assignments are added to the set S, e.g. for user j: S=S∪u{j}.

The procedure is repeated (492) for all the columns that have not been crossed out yet, i.e., for all subbands k such that user(k)=−1

Eventually, after running the steps of the scheduler shown in FIG. 4, there may remain users which are scheduled less than K subbands, even users with no subbands at all, if n<K·N. By choosing columns in a random fashion, favouring any user or subband over another is avoided.

It is apparent that in the proposed FSS algorithm each user may be assigned any number of subbands, up to the predefined maximum number K, and that this value may be greater than one. The same conclusions may be drawn if the algorithm operates over PRBs instead of over frequency subbands. This is in contrast to the solution proposed in US2009/0073926, in which each user may be assigned a maximum of one PRB.

The complexity of the proposed algorithm grows linearly with the number of subbands and the number of users, i.e. it is O(N·n).

Figure 5:
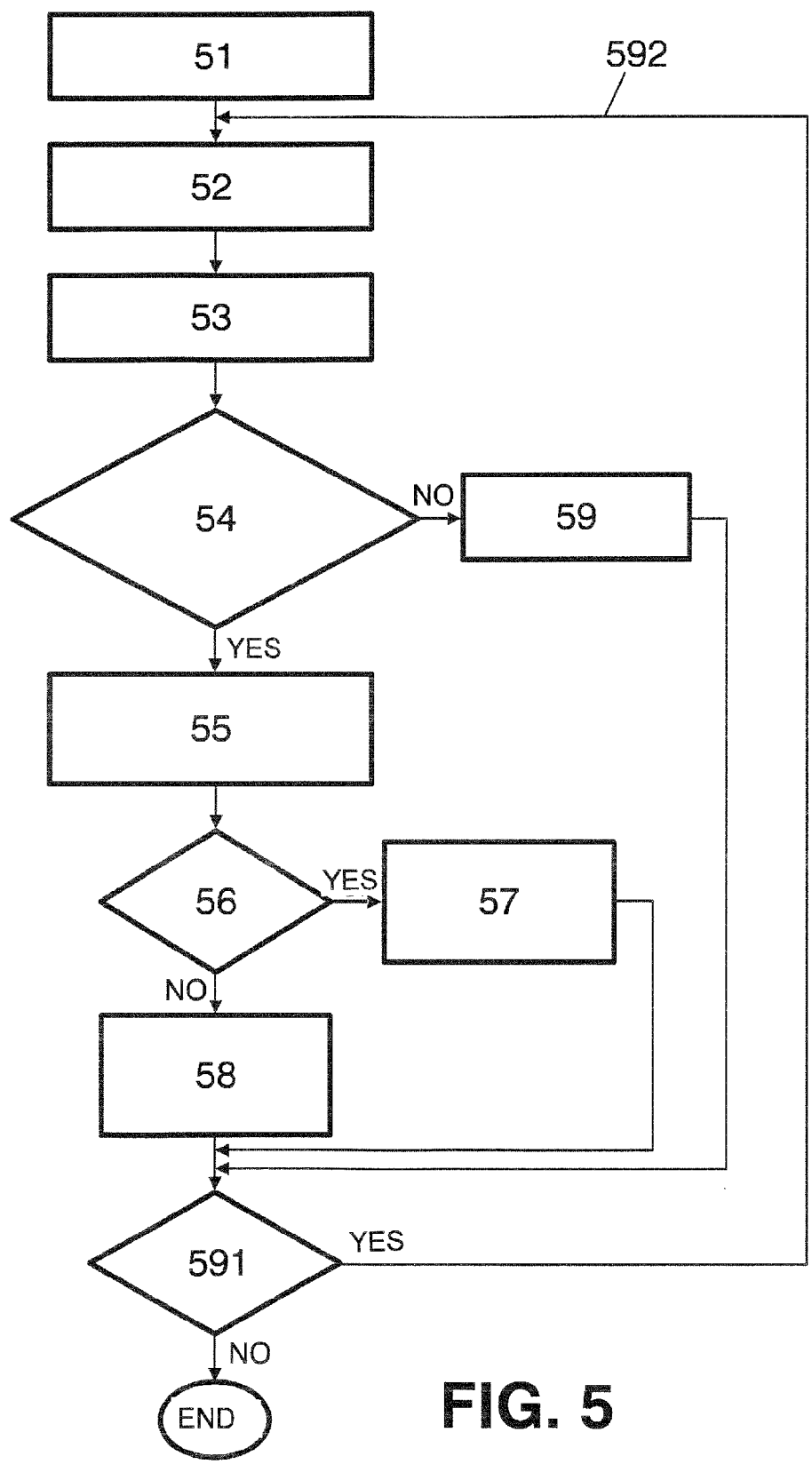
FIG. 5.—It shows a flow chart of a frequency selective scheduling, according to another possible embodiment of the invention wherein the scheduled frequency subbands can be adjacent.

FIG. 5 shows the case in that the subbands to be scheduled to a user must be adjacent (as it is specified in LTE uplink). Assuming that any user may be assigned a maximum number K of adjacent subbands and starting with the same set of scheduling metrics $T_{jk}$ calculated by the scheduler, the subbands to be scheduled are determined and assigned to the users by the FSS algorithm described below:

Let us denote by S the set of users that have already been scheduled K adjacent subbands throughout the algorithm:

$$S = \{j \in [0, N-1] \text{ such that } j = \text{user}(k_0), \ldots, j = \text{user}(k_0 + K_0 - 1), K_0 \leq K, k_0 \in [0, n-1]\}$$

The first step of the FSS algorithm is initialization (51) of the set S as in the previous case (downlink in LTE; non-adjacent subbands) to the void value, i.e., S={Ø} and initializing the values of the metrics to the calculated scheduling metrics $T_{jk}$ in accordance to the actual metric definition by the scheduler. Then, a random subband, namely k, is selected (52) from the set of subbands not assigned and the algorithm proceeds as follows:

Choosing user j whose sum of adjacent scheduling metrics is a maximum (53) counting from column k, among the users not yet scheduled. i.e. selecting the user j such that $$j = \underset{j' \notin S}{\text{argmax}}\{T_{j'k} + T_{j',k+1} + \ldots + T_{j',k+K_k-1}, \text{ for some } K_k \leq K\}.$$

The quantity $K_k$ is such that the sum of metrics is maximized, taking care of not "invading" other already assigned subbands. To simplify the notation we may denote:

$$T_{jk} + T_{j,k+1} + \ldots + T_{j,k+K_k-1} \equiv \text{sum}^*(j, k, K_k)$$

Thus $$j = \underset{j' \notin S}{\text{argmax}}\{\text{sum}*(j', k, K_k), \text{ for some } K_k \leq K\}.$$

If there were several maxima, j is chosen randomly among the candidates.

Analyzing (54) whether there exists another subband l∉[k, k+$K_k$−1] in which this user j has a higher maximum value of the scheduling metric $T_{jk}$, i.e., the following three conditions are met:

$$\text{user}(l) = -1, \text{user}(l+1) = -1, \text{user}(l+K_l-1) = -1 \text{ for some } K_l \leq K$$

$$\text{sum}*(j, l, K_l) > \text{sum}*(j, k, K_k)$$

$$j = \underset{j' \notin S}{\text{argmax}}\{\text{sum}*(j', l, K_l)\}$$

In this case user j might be a better candidate for subbands l, l+1, . . . , l+$K_l$−1 than for subbands k, k+1, . . . , k+$K_k$−1.

To elucidate this, the algorithm looks for secondary maxima (55) in of columns k and l by executing the following steps:

Choosing two other users $j_1$, $j_2$ such that:

$$j_1 = \underset{j' \notin S, j' \neq j}{\text{argmax}}\{\text{sum}*(j', k, K_k)\}, \text{ and}$$

$$j_2 = \underset{j' \notin S, j' \neq j}{\text{argmax}}\{\text{sum}*(j', l, K_l)\}.$$

The previously considered metrics are compared (56) by checking whether:

sum*($j_1$,k,$K_k$)+sum*(j,l,$K_l$)>sum*(j,k,$K_k$)+sum*($j_2$,l,$K_l$)

If so, the FSS algorithm assigns (57) user $j_1$ to subbands k, ..., k+$K_k$−1 and user j to subbands l, ..., l+$K_l$−1, i.e.:

user(k)←$j_1$,user(k+1)←$j_1$, ..., user(k+$K_k$−1)←$j_1$ user(l)←j,user(l+1)←j, ..., user(l+$K_l$−1)←j Otherwise, the algorithm assigns (58) user j to subbands k, ..., k+$K_k$−1 and user $j_2$ to subbands l, ..., l+$K_l$−1, i.e.:

user(k)←j,user(k+1)←j, ..., user(k+$K_k$−1)←j user(l)←$j_2$,user(l+1)←$j_2$, ..., user(l+$K_l$−1)←$j_2$ In the contrary case, that is, no other subjacent subband l∉[k,k+$K_k$−1] in which the user j has a metric higher than the value in subband k is found, the FSS algorithm assigns (59) user j to subbands k, ..., k+$K_k$−1, i.e.:.

user(k)←j,user(k+1)←j, ..., user(k+$K_k$−1)←j

The algorithm checks whether there are unassigned subbands (591). In case any user has already been scheduled the maximum number K of subjacent subbands throughout this algorithm, the corresponding row in the matrix is crossed out. The assignments are equivalent, in the matrix, to cross out the row and column(s) corresponding to the user and subband(s), meaning that these will not be considered in subsequent iterations of the algorithm. The procedure is repeated (592) for all subbands k such that user(k)=−1, i.e. for all the columns that have not been crossed out yet. Otherwise, it may still be taken into account for subsequent subband assignments. Each assigned subband must also be crossed out in the matrix, i.e., its associated column, and the scheduled users are added to the set S, e.g. for user j: S=S∪{j}

Eventually, after running the scheduler there may remain users which are scheduled less than K subbands, even users with no subbands at all, if n<K·N. By choosing columns in a random fashion, the proposed FSS avoids favouring any user or subband over another.

It can be seen that the proposed algorithm tackles the problem of scheduling contiguous blocks of resources—be it subbands, PRBs or whatever is defined-among a set of users, as is the case of e.g. LTE uplink. Moreover, the amount of scheduled resources may be different for different users, up to a maximum specified K. This is in contrast to the solution described in US2009/0073926, in which it is not possible to assign a block of contiguous PRBs to one user.

The localized version of the proposed algorithm grows linearly with the number of subbands and the number of users, as in the non-localized case, i.e. it is O(N·n).

In order to test the proposed FSS procedure, considering the two versions or cases described before (localized or adjacent subbands and non-localized/non-adjacent subbands), several simulations were carried out and the results are depicted in FIGS. 6-17. The main assumptions for the simulations are shown in the following table 2.

TABLE 2

| Parameter | Value |
|---|---|
| Number of users | 10, 20, 30 and 40 users |
| Scheduling algorithms | Throughput Relative Proportional Fair; Resource Relative Proportional Fair; FSS-Throughput Relative Proportional Fair; FSS-Resource Relative Proportional Fair |
| Channel type | ETU, EVA, EPA |
| Number of subframes (1 ms) | 30000 subframes |
| Length of the averaging window | 2000 subframes |
| Bandwidth | 20 MHz |
| Total number of PRBs | 96 PRB |
| Number of subbands | 12 subbands |
| Subband width | 8 PRB |
| Max number of subbands per user | 2 subbands |
| UE speed | 0 km/h |
| Number of runs for each configuration | 10 runs |
| Traffic type | Full Buffer |
| Link-to-system mapping | Performance curves obtained from link-level simulations |

The definitions of scheduling metrics correspond to two criteria: Throughput Relative Proportional Fair and Resource Relative Proportional Fair. Four scheduling algorithms have been compared: two of them operating only in time domain (Throughput Relative Proportional Fair, Resource Relative Proportional Fair), and the other two operating in time and frequency with the proposed FSS method (FSS-Throughput Relative Proportional Fair, FSS-Resource Relative Proportional Fair). A number of users are randomly distributed over a cell, in a scenario in which the radio channel is supposed to be one of ITU reference channels [3GPP TS 36.104, Evolved Universal Terrestrial Radio Access (E-UTRA); Base Station, Radio Transmission and Reception (Release 8)]: ETU—Extended Typical Urban—, EVA—Extended Vehicular A— and EPA—Extended Pedestrian A—. For the sake of simplicity, it is supposed that the users have no speed, i.e., 0 km/h, so that their frequency response remains constant over time, but each user's response is made different by considering random realizations. The link-to-system mapping is accomplished through a set of performance curves, obtained with an LTE link-level simulation tool.

The scheduler runs a high number of subframes, 30000 LTE subframes, and the average past throughput or resources is measured over a window of 2000 subframes. Considering a total system bandwidth of 96 PRBs, the number of available subbands is 12, according to 3GPP TS 36.213, and each subband spanning 8 PRBs. Each user is allowed to be scheduled a maximum of 2 subbands. Traffic type is Full Buffer. In downlink the subbands scheduled to a user spread over the entire spectrum, but in uplink they are necessarily contiguous. A total of 10 runs were taken for each of the results presented below, taking the average results in all the cases.

Figure 6:
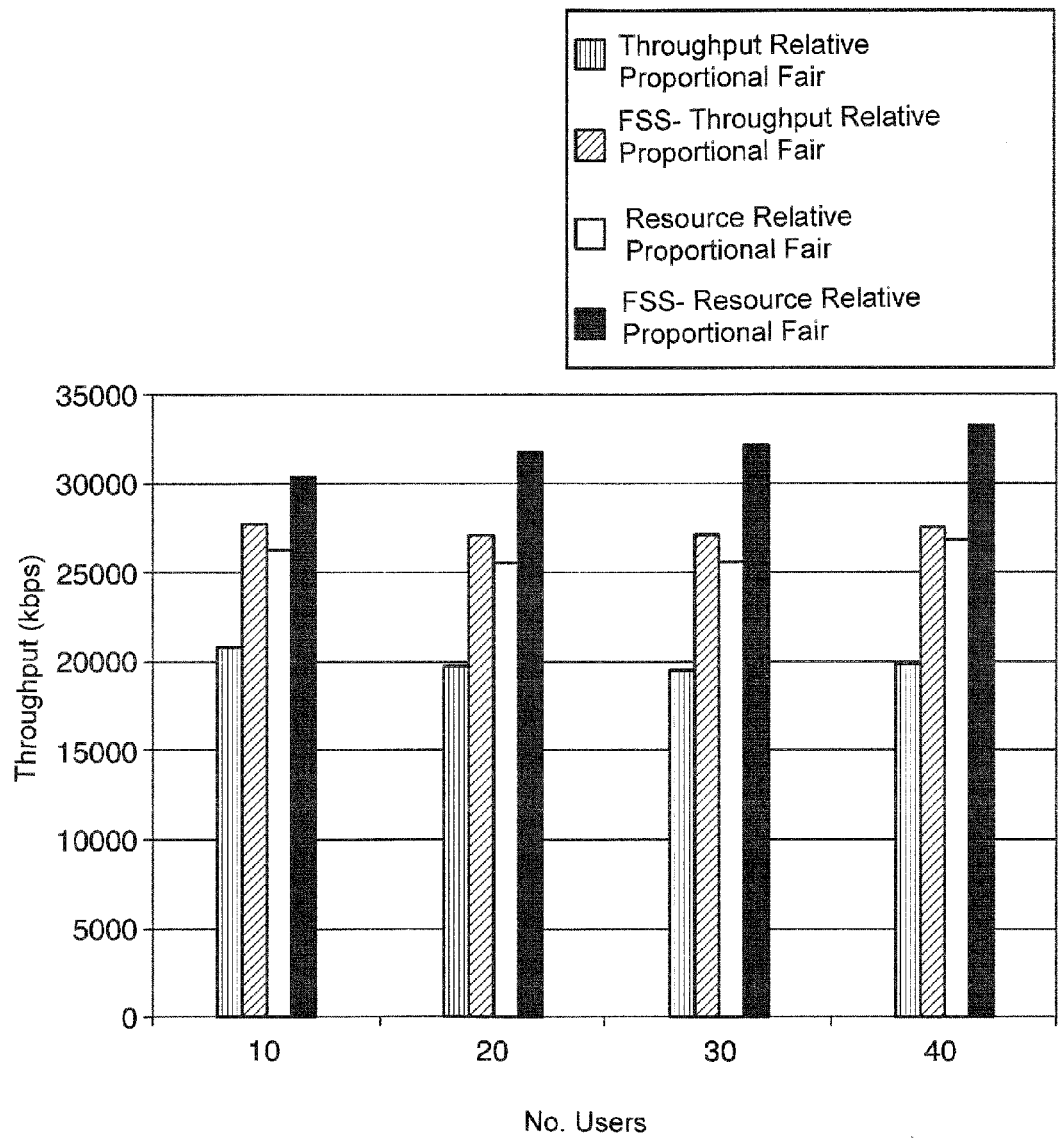
FIG. 6.—It shows a histogram bars which represent simulation results of the global cell throughput in downlink of a LTE network, considering Extended Typical Urban users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 7:
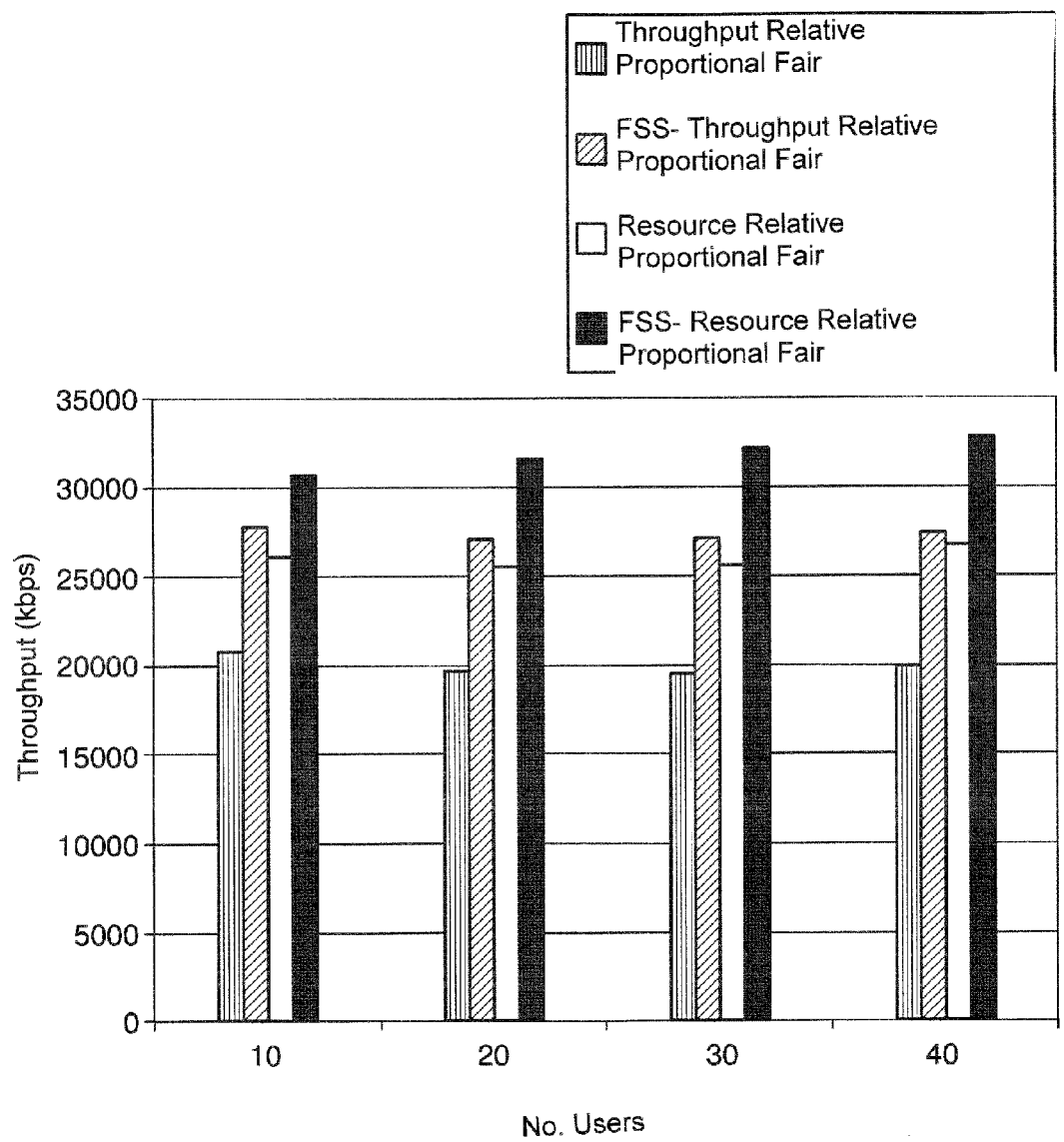
FIG. 7.—It shows a histogram bars which represent simulation results of the global cell throughput in downlink of a LTE network, considering Extended Vehicular A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 8:
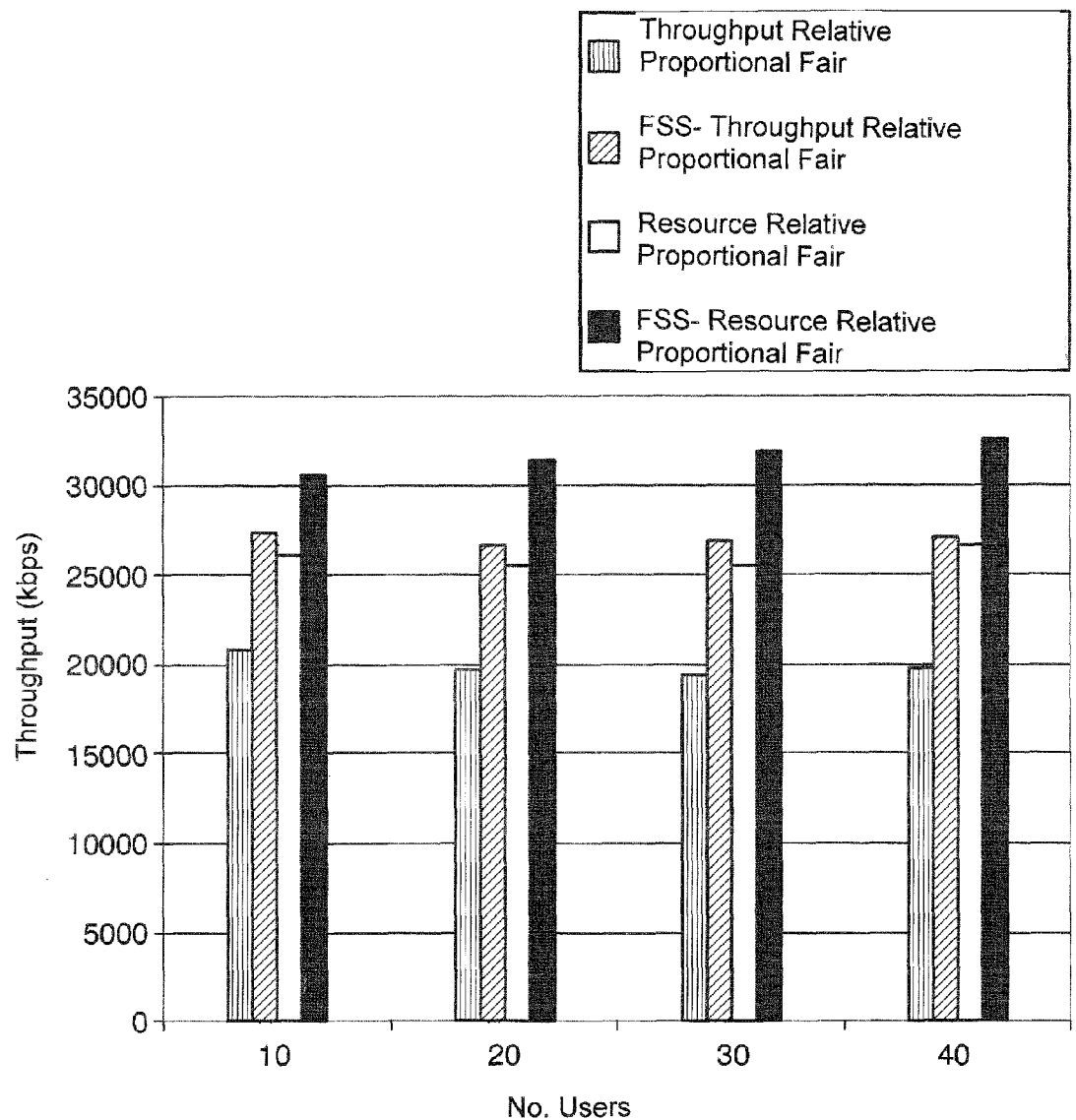
FIG. 8.—It shows a histogram bars which represent simulation results of the global cell throughput in downlink of a LTE network, considering Extended Pedestrian A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.

In the case of scheduling non-localized subbands, FIGS. 6, 7 and 8 show the global cell throughput—throughput versus number of users—for the three considered radio channels, respectively: ETU, EVA, and EPA.

The striped bars correspond to Throughput Relative Proportional Fair; the bar with vertical stripes refers to time-only scheduling and the one with tilted stripes relates to the proposed FSS method. The white and black bars show the same results but considering Resource Relative Proportional Fair for both cases, time-only scheduling and the proposed FSS, respectively.

It can be shown that, in all cases, the cell throughput is considerably higher with the proposed FSS method, up to nearly 40% for EVA and 30 users. Resource Relative Proportional Fair gets a higher global throughput with FSS, and in this case the throughput increases with the number of active users. Similar conclusions can be drawn from the three reference channels.

Figure 9:
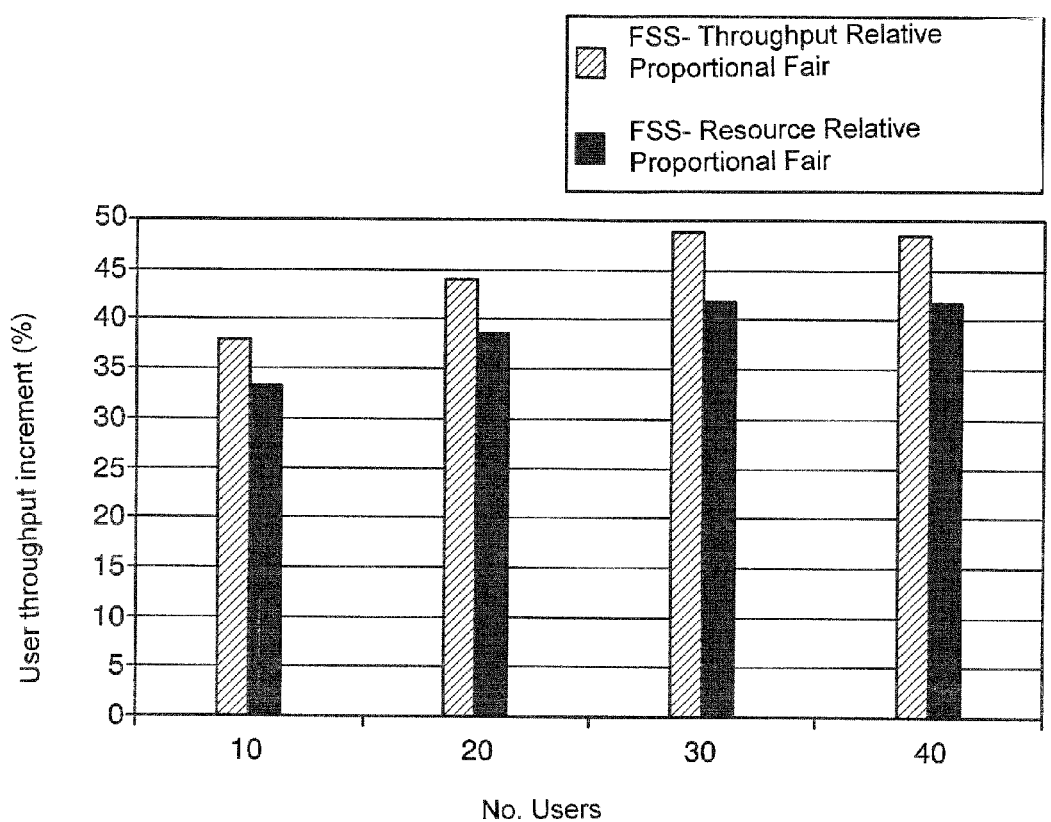
FIG. 9.—It shows a histogram bars which represent simulation results of the average per-user throughput increment in downlink of a LTE network, considering Extended Typical Urban users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 10:
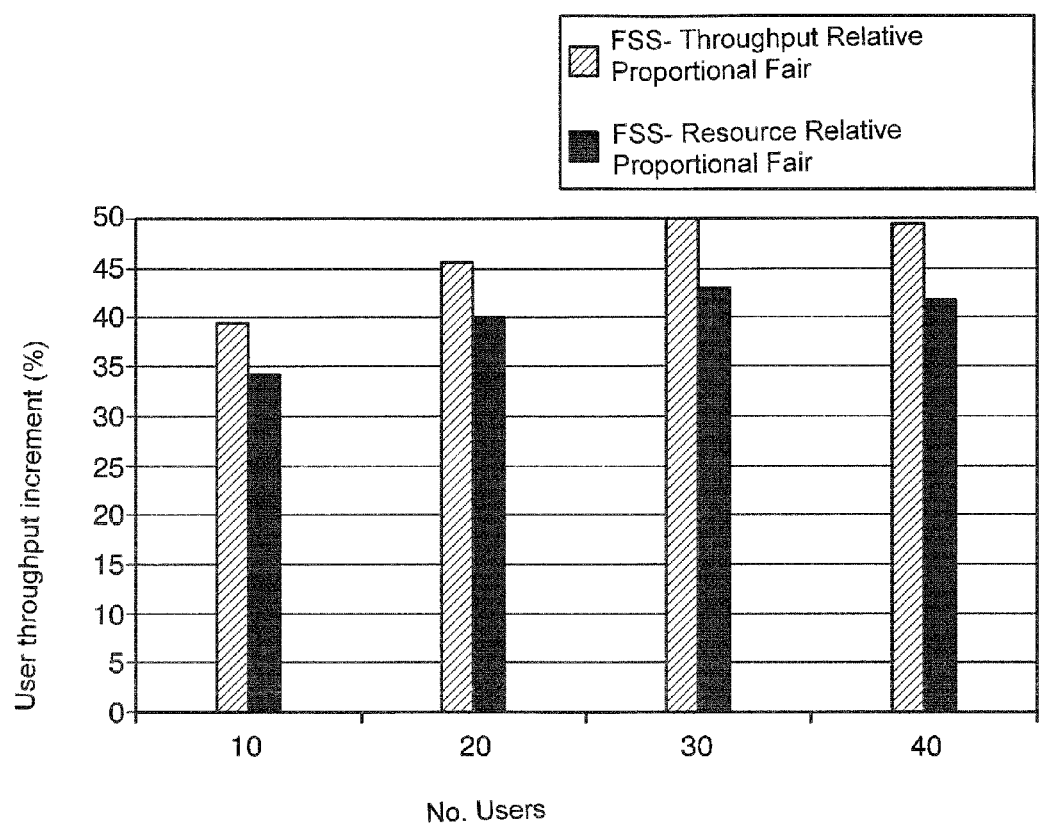
FIG. 10.—It shows a histogram bars which represent simulation results of the average per-user throughput increment in downlink of a LTE network, considering Extended Vehicular A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 11:
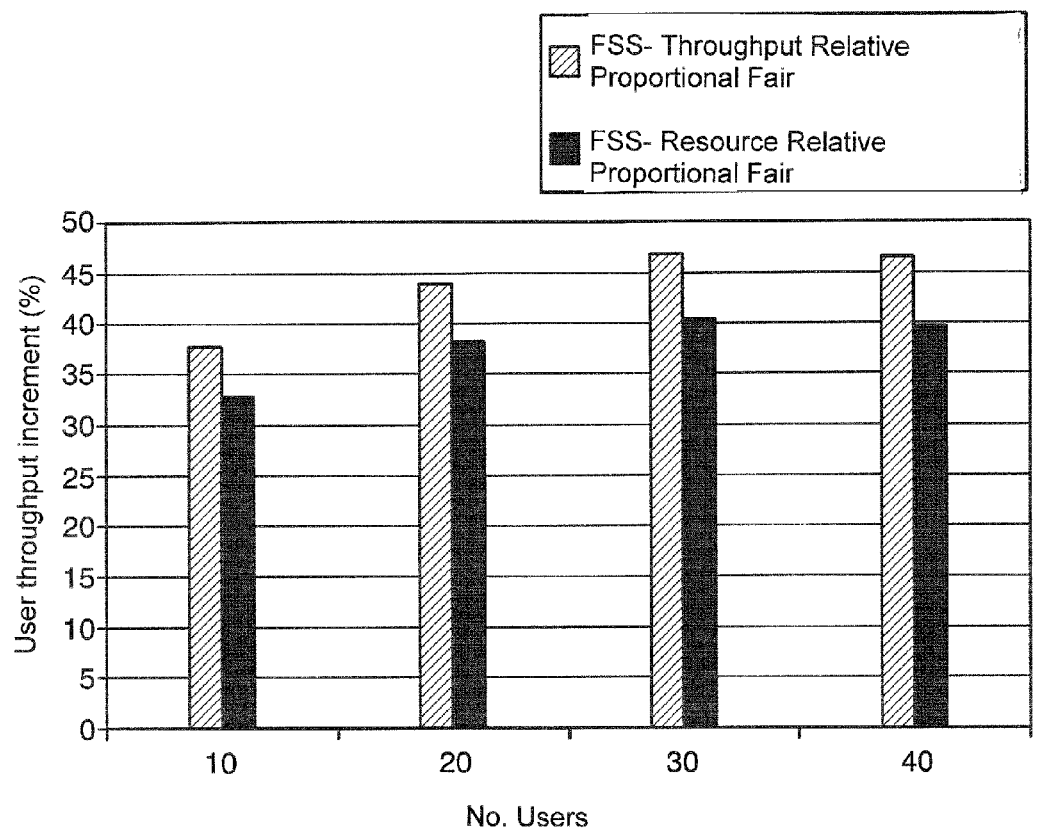
FIG. 11.—It shows a histogram bars which represent simulation results of the average per-user throughput increment in downlink of a LTE network, considering Extended Pedestrian A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.

FIGS. 9, 10 and 11 show, for said three reference channels—EVA, ETU, and EPA respectively—and non-localized subbands, that the users' throughput is also increased when using the proposed FSS method, compared to time-only scheduling. The average per-user throughput increment gets higher with the number of active users, up to a maximum of nearly 50% for 30 users; 40 users show approximately similar numbers than 30 users.

Figure 12:
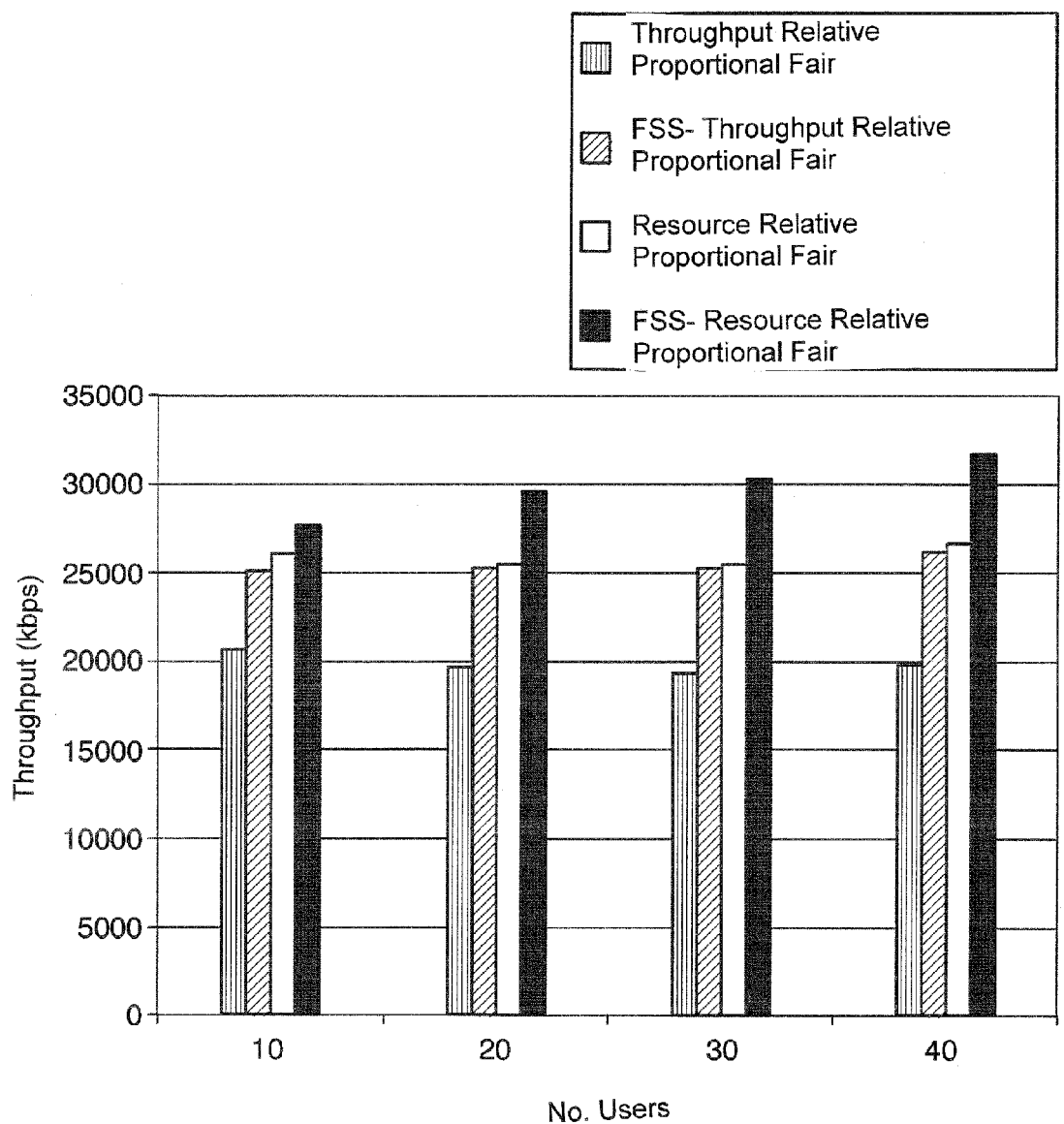
FIG. 12.—It shows a histogram bars which represent simulation results of the global cell throughput in uplink of a LTE network, considering Extended Typical Urban users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 13:
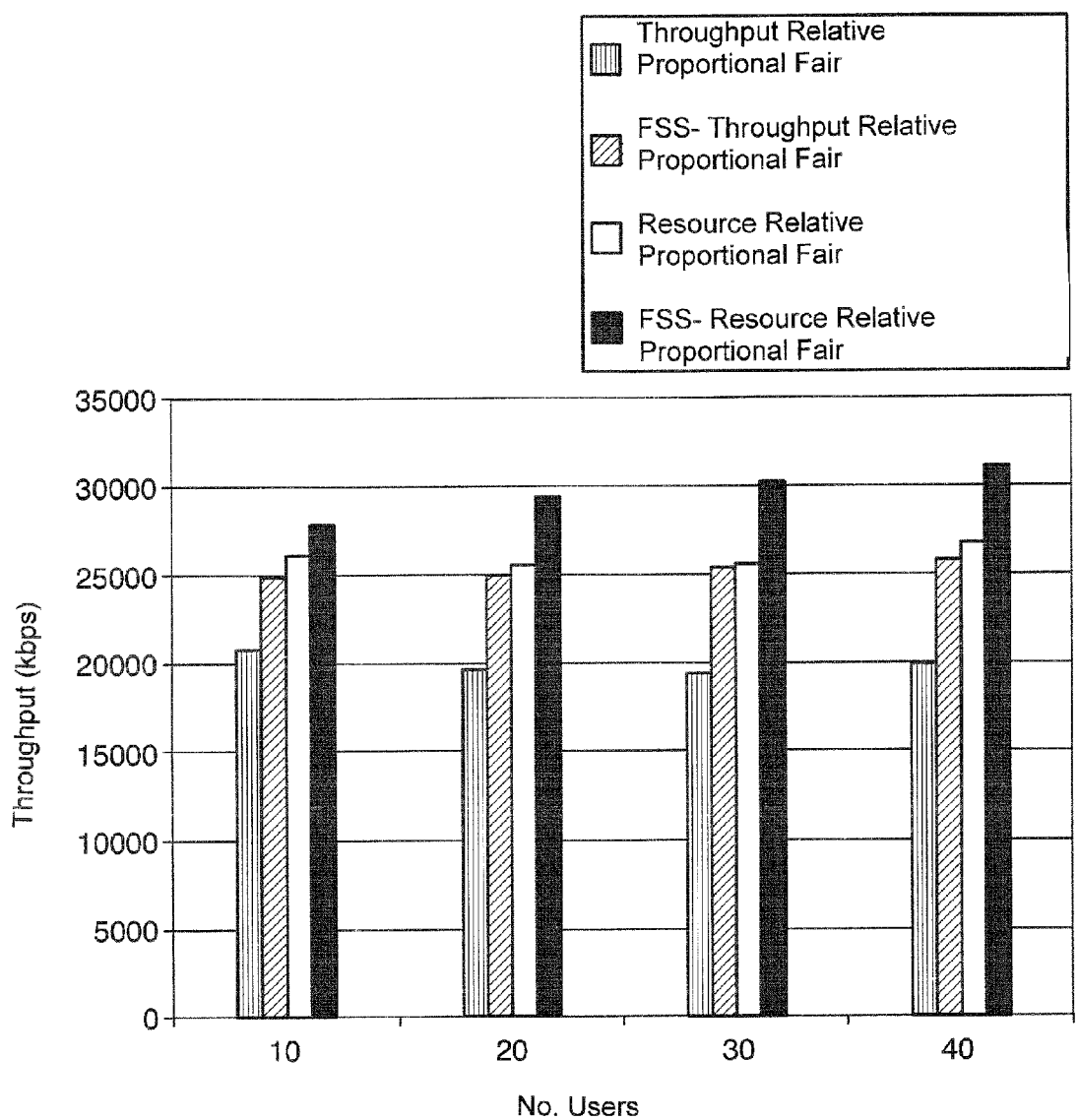
FIG. 13.—It shows a histogram bars which represent simulation results of the global cell throughput in uplink of a LTE network, considering Extended Vehicular A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 14:
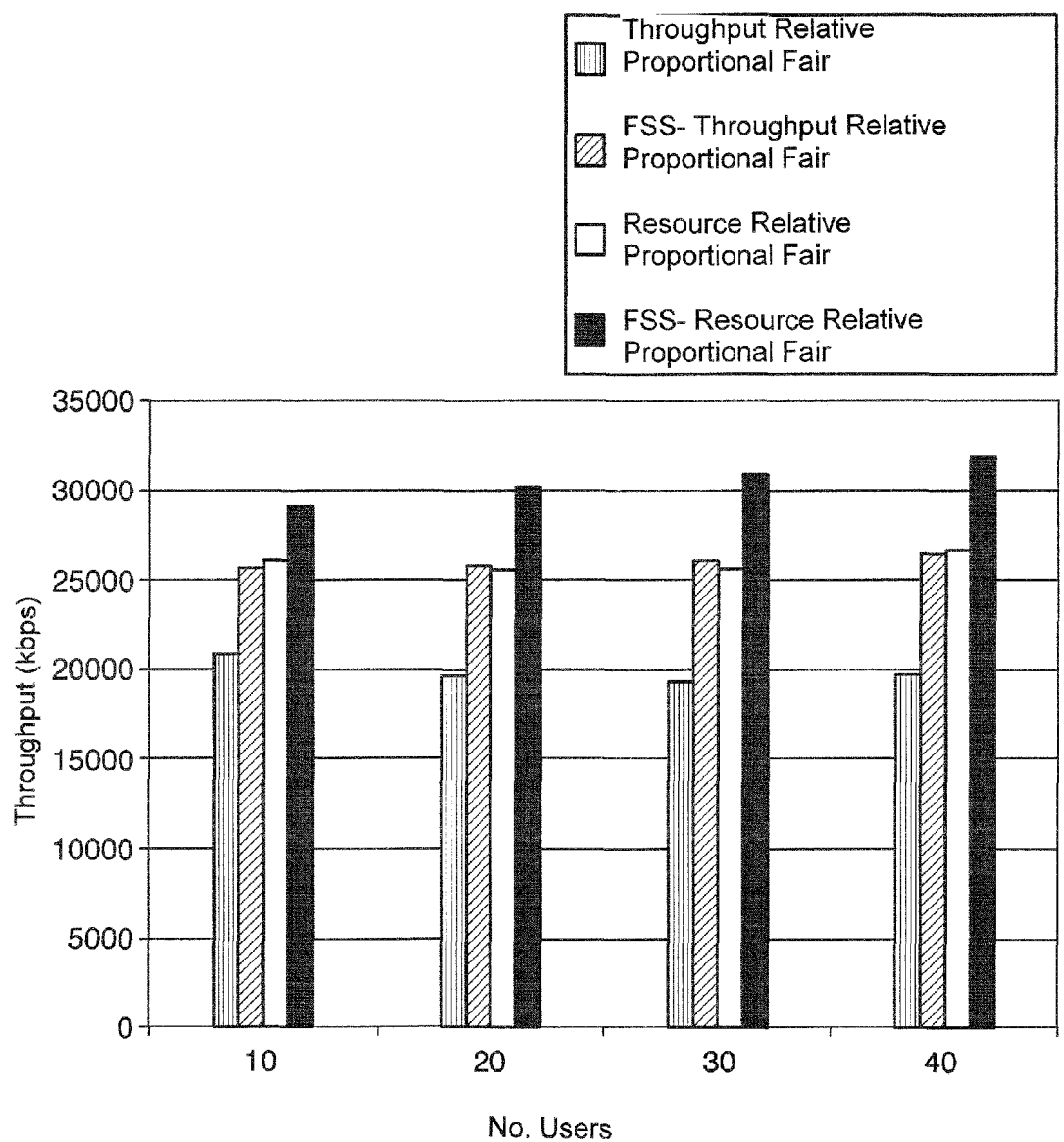
FIG. 14.—It shows a histogram bars which represent simulation results of the global cell throughput in uplink of a LTE network, considering Extended Pedestrian A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 15:
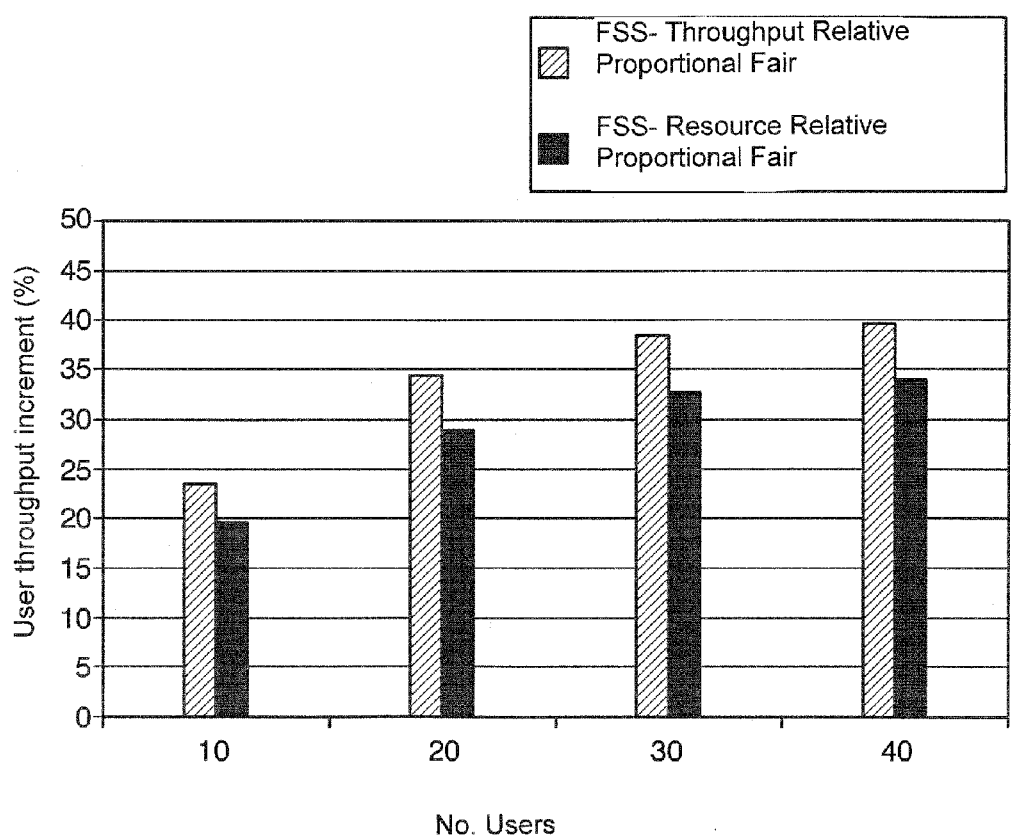
FIG. 15.—It shows a histogram bars which represent simulation results of the average per-user throughput increment in uplink of a LTE network, considering Extended Typical Urban users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 16:
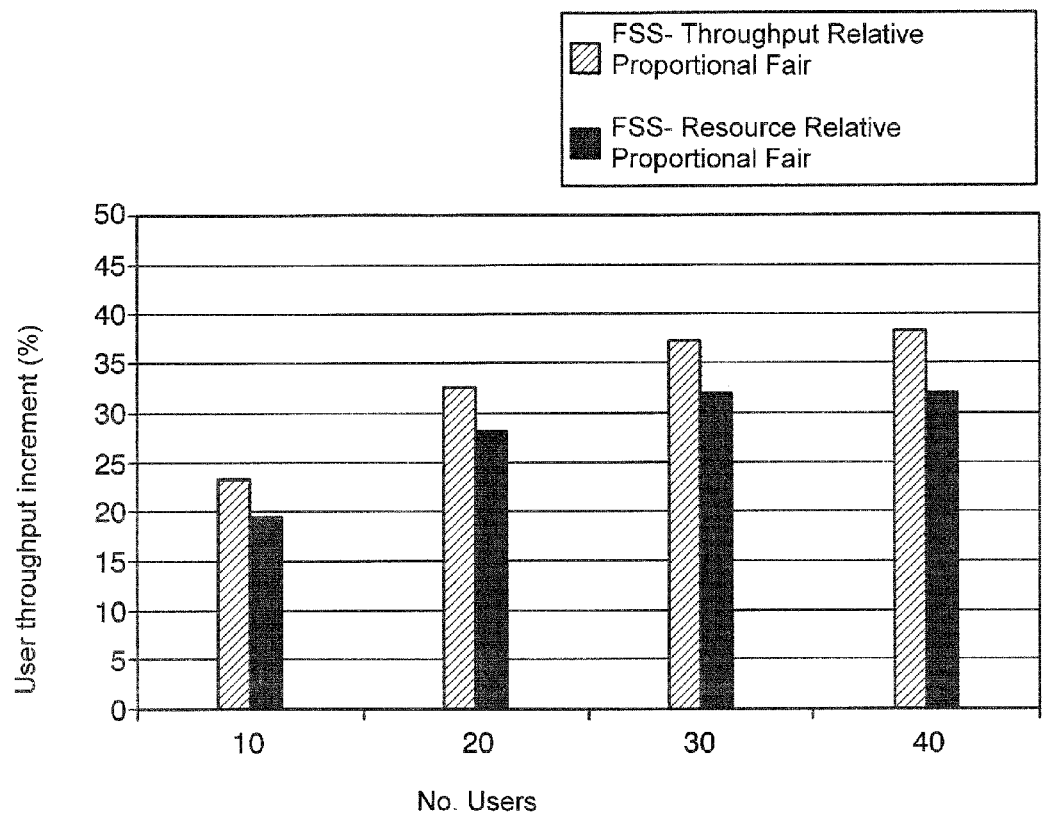
FIG. 16.—It shows a histogram bars which represent simulation results of the average per-user throughput increment in uplink of a LTE network, considering Extended Vehicular A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.
Figure 17:
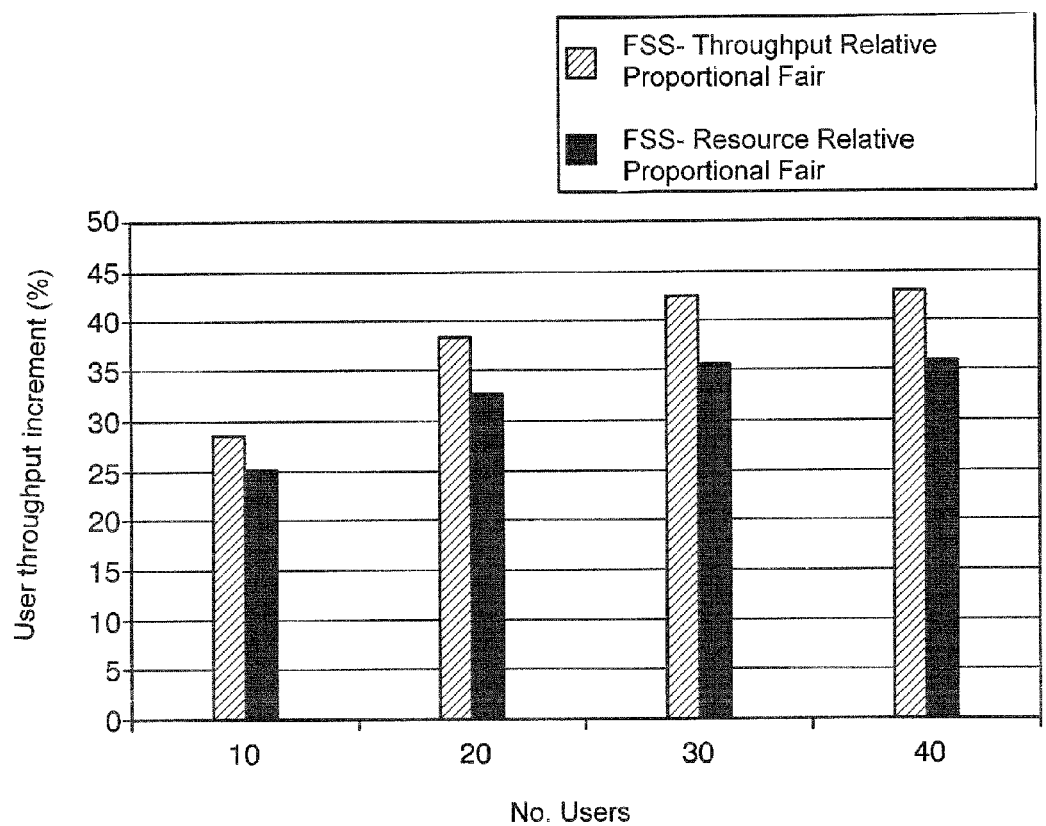
FIG. 17.—It shows a histogram bars which represent simulation results of the average per-user throughput increment in uplink of a LTE network, considering Extended Pedestrian A users, when applying a time-only scheduling known in the prior art using scheduling metrics calculated by Throughput Relative Proportional Fair and Resource Relative Proportional Fair criteria respectively, and when applying the frequency selective scheduling in accordance to a possible embodiment of the invention using the scheduling metrics calculated with the two same criteria.

In the case of scheduling localized subbands the results are qualitatively the same, but with lower throughput values due to the subbands adjacency restriction. In order to compare with the non-localized case, simulations have been carried out with the same parameters and assumptions, although in a real scenario it should be advisable to employ different link-level curves for this case (as it usually corresponds to uplink LTE, as opposed to the non-localized case which is typical of downlink LTE). However, for comparison purposes it is desirable to maintain the parameters of the simulation, so as to observe the differences caused by the FSS procedure. FIGS. 12, 13 and 14 show the cell throughput. FIGS. 15, 16 and 17 show respectively for each reference channel, EVA, ETU, and EPA, the per-user throughput increment. It is apparent that the same conclusions can be drawn as in the non-adjacent case, but with lower throughput due to the adjacency restriction.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for scheduling radio resources in mobile communication networks, comprising:
   i) defining a set of frequency bands which is assignable to users,
   ii) receiving at least a value of channel quality indicator reported from at least a user,
   iii) for each reporting user, calculating scheduling metrics based on the received values of channel quality indicator, the scheduling metrics being related to a pair of user and frequency band;
   iv) for each frequency band of the assignable set, selecting a user for which the calculated scheduling metric is a main maximum in the frequency band,
   v) checking whether there is at least another frequency band of the assignable set in which the selected user has a calculated scheduling metric value higher than the main maximum and if so:
      searching secondary maxima of calculated scheduling metrics among all users in another frequency band of the assignable set which is different from the frequency band used in step iv,
      for every user and frequency band resulted from the searching, comparing the main maximum of each user with the secondary maxima of the rest of the reporting users, and
      assigning at least the selected user to at least one frequency band of the assignable set depending on the comparison used and the result of the comparison;
   vi) otherwise, assigning the selected user to at least the frequency band used in step iv.

2. The method according to claim 1, wherein the set of frequency bands assignable to users are adjacent.

3. The method according to claim 2, wherein the step iv) comprises selecting one user j determined by the expression $$j = \underset{j' \notin S}{\mathrm{argmax}}\{\mathrm{sum}*(j', k, K_k), \text{ for some } K_k \leq K\},$$

being $T_{jk}+T_{j,k+1}+\ldots+T_{j,k+K_k-1} = \mathrm{sum}*(j,k,K_k)$, $T_{jk}$ denotes the scheduling metric of user j calculated in a frequency band k randomly chosen from the set of assignable frequency bands, being K the maximum number of adjacent frequency bands which is assignable to any user and S denotes a set of users which are already assigned to K adjacent frequency bands.

4. The method according to claim 3, wherein the step v) comprises checking whether there is another frequency band l from the set of assignable frequency bands in which the selected user j has a calculated scheduling metric with a higher value than the sum of scheduling metrics of user j calculated in the frequency band k and some of its adjacent frequency bands.

5. The method according to claim 4, wherein searching secondary maxima of calculated scheduling metrics comprises choosing two other users $j_1$, $l_2$ which are determined respectively by the expressions:

$$j_1 = \underset{j' \notin S, j' \neq j}{\mathrm{argmax}}\{\mathrm{sum}*(j', k, K_k)\}, \text{ and}$$

$$j_2 = \underset{j' \notin S, j' \neq j}{\mathrm{argmax}}\{\mathrm{sum}*(j', l, K_l)\},$$

and comparing the main maximum of each user with the secondary maxima of the rest of the reporting users comprises checking whether:

$$\mathrm{sum}*(j_1,k,K_k)+\mathrm{sum}*(j,l,K_l) > \mathrm{sum}*(j,k,K_k)+\mathrm{sum}*(j_2,l,K_l).$$

6. The method according to claim 5, wherein if $\mathrm{sum}*(j_1,k,K_k)+\mathrm{sum}*(j,l,K_l) > \mathrm{sum}*(j,k,K_k)+\mathrm{sum}*(j_2,l,K_l)$, the user $j_1$ is assigned to adjacent frequency bands $k, \ldots, k+K_k-1$ and the user j is assigned to adjacent frequency bands $l, \ldots, l+K_l-1$; otherwise, the user j to is assigned to adjacent frequency bands $k, \ldots, k+K_k-1$ and the user $j_2$ is assigned to adjacent frequency bands $l, \ldots, l+K_l-1$.

7. The method according to claim 3, wherein the step vi) comprises assigning the user j to adjacent frequency bands $k, \ldots, k+K_k-1$.

8. The method according to claim 1, wherein the set of frequency bands assignable to users are non-adjacent.

9. The method according to claim 8, wherein the step iv) comprises selecting one user j for which the value of the scheduling metric $T_{jk}$ calculated in a frequency band k randomly chosen from the set of assignable frequency bands is $$T_{jk} = \underset{j' \notin S}{\max}\{T_{j'k}\},$$

being K the maximum number of frequency bands assignable to any user and S a set of users which are already assigned to the maximum number K of frequency bands.

10. The method according to claim 9, wherein the step v) comprises checking whether there is another frequency band l from the set of assignable frequnncy bands in which the selected user j has a calculated scheduling metric $T_{jl}$ which meets $$T_{jl} = \underset{j' \notin S}{\max}\{T_{j'l}\}$$

and $T_{jl} > T_{jk}$.

11. The method according to claim 10, wherein searching secondary maxima of calculated scheduling metrics comprises choosing a user $j_1$, for which the value of the scheduling metric $T_{jlk}$ calculated in the frequency band k is $$T_{j_1k} = \max_{j' \notin S, j' \neq j} \{T_{j'k}\}$$

and choosing another user $j_2$ for which the value of the scheduling metric $T_{j2l}$ calculated in the other frequency band l is $$T_{j_2l} = \max_{j' \notin S, j' \neq j} \{T_{j'l}\}$$

and comparing the main maximum of each user with the secondary maxima of the rest of the reporting users comprises checking whether $T_{j_1k}+T_{jl}>T_{jk}+T_{j_2l}$.

12. The method according to claim 11, wherein if $T_{j_1k}+T_{jl}>T_{jk}+T_{j_2l}$, the user $j_1$ is assigned to frequency band k and the user j is assigned to the other frequency band l; otherwise, the user j to is assigned to frequency band k and the user $j_2$ is assigned to other frequency band l.

13. The method according to claim 1, further comprising repeating the steps i)-v) until all the frequency bands are assigned to users.

14. The method according to claim 1, wherein the set of frequency bands which is assignable to users comprises frequency subbands defined for Long Term Evolution.

15. The method according to claim 11, wherein the scheduling metrics are calculated based on the received values of channel quality indicator and throughput values of the users in given subbands.

16. The method according to claim 1, wherein resources are to be scheduled in downlink.

17. The method according to claim 1, wherein resources are to be scheduled in uplink.

* * * * *